(12) United States Patent
Sakai et al.

(10) Patent No.: US 10,239,523 B2
(45) Date of Patent: *Mar. 26, 2019

(54) ROUTE EVALUATION DEVICE

(71) Applicant: Toyota Jidosha Kabushiki Kaisha, Toyota-shi, Aichi-ken (JP)

(72) Inventors: Katsuhiro Sakai, Hadano (JP); Hiromitsu Urano, Susono (JP); Kazuaki Aso, Susono (JP); Masahiro Harada, Atsugi (JP); Toshiki Kindo, Yokohama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/644,190

(22) Filed: Jul. 7, 2017

(65) Prior Publication Data
US 2017/0334442 A1    Nov. 23, 2017

Related U.S. Application Data

(63) Continuation of application No. 14/792,187, filed on Jul. 6, 2015, now Pat. No. 9,731,718, which is a (Continued)

(30) Foreign Application Priority Data

Jun. 12, 2009    (JP) .................................. 2009-141369

(51) Int. Cl.
*B60W 30/09* (2012.01)
*B60W 30/095* (2012.01)
(Continued)

(52) U.S. Cl.
CPC .......... *B60W 30/09* (2013.01); *B60W 30/095* (2013.01); *B60W 30/0953* (2013.01);
(Continued)

(58) Field of Classification Search
None
See application file for complete search history.

(56) References Cited

U.S. PATENT DOCUMENTS 5,477,461 A    12/1995    Waffler et al.
6,445,308 B1    9/2002    Koike
(Continued)

FOREIGN PATENT DOCUMENTS

DE    10257842 A1    11/2003
DE    102007058538 A1    6/2009
(Continued)

OTHER PUBLICATIONS

Kusano, JP 2006205860 (EPO translation Feb. 28, 2018). (Year: 2018).*

*Primary Examiner* — Kevin P Mahne
(74) *Attorney, Agent, or Firm* — Dinsmore & Shohl LLP

(57) ABSTRACT

Disclosed is a route evaluation device that enables traveling along a route in consideration of an operation of the driver of another vehicle, and can realize a safer traffic environment. A route evaluation device includes a route candidate generation section that generates route candidates of a host-vehicle, a route prediction section that predicts routes of another vehicle, a classification section that classifies the interference states of the route candidates of the host-vehicle and the predicted routes of another vehicle into a plurality of interference forms, and a route evaluation section that evaluates the routes of the host-vehicle on the basis of the interference forms classified by the classification section.

5 Claims, 15 Drawing Sheets

Related U.S. Application Data continuation of application No. 13/321,159, filed as application No. PCT/JP2010/059995 on Jun. 8, 2010, now Pat. No. 9,109,906.

(51) Int. Cl.

| | |
|---|---|
| *B60W 30/10* | (2006.01) |
| *B60W 30/18* | (2012.01) |
| *B60W 30/20* | (2006.01) |
| *G01C 21/26* | (2006.01) |
| *G08G 1/0967* | (2006.01) |
| *G08G 1/16* | (2006.01) |

(52) U.S. Cl.
CPC ......... *B60W 30/0956* (2013.01); *G01C 21/26* (2013.01); *G08G 1/09675* (2013.01); *G08G 1/096725* (2013.01); *G08G 1/096791* (2013.01); *G08G 1/163* (2013.01); *G08G 1/166* (2013.01); *G08G 1/167* (2013.01); B60W 30/10 (2013.01); B60W 30/18 (2013.01); B60W 30/20 (2013.01); B60W 2550/10 (2013.01); B60W 2550/20 (2013.01); G08G 1/162 (2013.01)

(56) References Cited

U.S. PATENT DOCUMENTS

| | | |
|---|---|---|
| 6,650,983 B1 | 11/2003 | Rao et al. |
| 6,792,351 B2 | 9/2004 | Lutter |
| 6,926,374 B2 | 8/2005 | Dudeck et al. |
| 6,965,829 B2 | 11/2005 | Yamadaji et al. |
| 7,961,084 B2 | 6/2011 | Aso et al. |
| 2002/0059097 A1 | 5/2002 | Wahlbin et al. |
| 2004/0193347 A1 | 9/2004 | Harumoto et al. |
| 2005/0131588 A1 | 6/2005 | Kuge et al. |
| 2006/0085131 A1 | 4/2006 | Yopp et al. |
| 2006/0111842 A1 | 5/2006 | Sugimoto et al. |
| 2006/0178789 A1 | 8/2006 | Kuge |
| 2007/0150196 A1* | 6/2007 | Grimm ............... B60T 7/22 701/301 |
| 2007/0225914 A1 | 9/2007 | Kawazoe et al. |
| 2007/0233386 A1 | 10/2007 | Saito et al. |
| 2007/0255474 A1 | 11/2007 | Hayakawa et al. |
| 2008/0021613 A1 | 1/2008 | Hamaguchi et al. |
| 2008/0167820 A1 | 7/2008 | Oguchi et al. |
| 2008/0208409 A1 | 8/2008 | Matsumoto et al. |
| 2008/0228400 A1 | 9/2008 | Wheeler |
| 2008/0281521 A1 | 11/2008 | Shirato |
| 2008/0303696 A1 | 12/2008 | Aso et al. |
| 2009/0024357 A1 | 1/2009 | Aso et al. |
| 2009/0099734 A1 | 4/2009 | Le et al. |
| 2009/0132125 A1 | 5/2009 | Yonezawa et al. |
| 2010/0030430 A1 | 2/2010 | Hayakawa et al. |
| 2010/0030472 A1 | 2/2010 | Kindo et al. |
| 2010/0042323 A1 | 2/2010 | Harada et al. |
| 2010/0060511 A1 | 3/2010 | Nouvel et al. |
| 2010/0063735 A1 | 3/2010 | Kindo et al. |
| 2010/0114418 A1 | 5/2010 | Samuel et al. |
| 2010/0121576 A1 | 5/2010 | Aso et al. |
| 2010/0217483 A1 | 8/2010 | Matsuno |
| 2010/0235035 A1 | 9/2010 | Nishira et al. |
| 2011/0015850 A1 | 1/2011 | Tange et al. |
| 2011/0137487 A1 | 6/2011 | Nishimaki et al. |
| 2011/0276227 A1 | 11/2011 | Sugawara et al. |
| 2012/0016581 A1 | 1/2012 | Mochizuki et al. |
| 2012/0101711 A1* | 4/2012 | Furmston ............... G01S 7/415 701/300 |
| 2012/0277957 A1 | 11/2012 | Inoue et al. |
| 2012/0323474 A1 | 12/2012 | Breed et al. |

FOREIGN PATENT DOCUMENTS

| | | |
|---|---|---|
| EP | 2172919 A1 | 4/2010 |
| JP | 2004-326149 A | 11/2004 |
| JP | 2006205860 A * | 8/2006 |
| JP | 2007-210563 A | 8/2007 |
| JP | 2007257519 A | 10/2007 |
| JP | 2009-020745 A | 1/2009 |
| JP | 2009-026321 A | 2/2009 |
| JP | 2009-064088 A | 3/2009 |
| WO | 2006-070865 A1 | 7/2006 |
| WO | 2008-156201 A1 | 12/2008 |
| WO | 2009-071370 A2 | 6/2009 |

* cited by examiner

Fig. 14

| | | ANOTHER VEHICLE | | |
| --- | --- | --- | --- | --- |
| | | FRONT SURFACE | SIDE SURFACE | REAR SURFACE |
| HOST-VEHICLE | FRONT SURFACE | A and B | A | A |
| | SIDE SURFACE | B | A and B | A |
| | REAR SURFACE | B | B | A and B |

A --- HOST-VEHICLE INTERFERES WITH ROUTE OF ANOTHER VEHICLE
B --- ANOTHER VEHICLE INTERFERES WITH ROUTE OF HOST-VEHICLE

ROUTE EVALUATION DEVICE

CROSS REFERENCE TO RELATED APPLICATIONS

This application is a continuation of U.S. patent application Ser. No. 14/792,187 filed Jul. 6, 2015, which in turn is a continuation of U.S. patent application Ser. No. 13/321,159 filed Nov. 17, 2011 (now U.S. Pat. No. 9,109,906), which in turn is a U.S. National Phase Entry of PCT/JP2010/059995 filed Jun. 8, 2010, which claims priority to Japanese Patent Application No. 2009-141369 filed Jun. 12, 2009.

TECHNICAL FIELD

The present invention relates to a route evaluation device that generates a route of a host-vehicle for use at the time of traveling control of the host-vehicle.

BACKGROUND ART

In the related art, a risk acquisition device is known which detects a movable object in the vicinity of the host-vehicle, determines the possibility of collision of the movable object and the host-vehicle, and outputs the possibility of collision as the degree of risk. As a technique using the risk acquisition device, for example, a collision prevention device is known.

For example, Patent Document 1 (JP2009-20745A) describes a collision prevention device which calculates a plurality of possible routes of the host-vehicle and another vehicle in the vicinity of the host-vehicle on the basis of the traveling states of the host-vehicle and another vehicle, and calculates the best host-vehicle route collision probability (host-vehicle risk) on the basis of the routes. Further, in this collision prevention device, the best host-vehicle route collision probability (offset risk) is calculated on the basis of the possible route of the host-vehicle and the possible route of another vehicle which are calculated on the basis of the offset traveling state of the host-vehicle, which is offset from the traveling state of the host-vehicle.

CITATION LIST

Patent Literature

[PTL 1] JP2009-20745A

SUMMARY OF INVENTION

Technical Problem

In addition to taking into consideration of the degree of risk as in the risk acquisition device of the related art, for example, it is preferable to generate a route in consideration of the driver of another vehicle such that the driver of another vehicle is not forced to take a sudden avoidance operation or braking operation due to traveling of the host-vehicle.

An object of the invention is to provide a route evaluation device that enables traveling along a route in consideration of an operation of the driver of another vehicle, and can realize a safer traffic environment.

Solution to Problem

An aspect of the invention provides a route evaluation device. The route evaluation device includes a route candidate generation unit that generates route candidates of a host-vehicle, a route prediction unit that predicts routes of another mobile object, a classification unit that classifies interference forms of the route candidates of the host-vehicle and the predicted routes of another mobile object into a plurality of interference forms, and a route evaluation unit that evaluates the route candidates of the host-vehicle on the basis of the interference forms classified by the classification unit.

The term "route" used herein refers to a concept including temporal elements, such as time and speed, and is different from the term "path" which does not include the concept of such temporal elements. The term "interference" refers to the host-vehicle and another vehicle crossing each other planarly in consideration of the vehicle width and the vehicle length.

With the route evaluation device according to the aspect of the invention, the interference forms of the route candidates of the host-vehicle and the predicted routes of another mobile object are classified into a plurality of interference forms on the basis of the patterns of a plurality of interference forms stored in advance. Therefore, an interference form occurring when the host-vehicle interferes with the route of another mobile object can be classified as one interference form, and the relevant route candidate can be highly evaluated as a route candidate to be avoided. As a result, it becomes possible to travel along a route in consideration of an operation of the drive of another vehicle, and a safer traffic environment can be realized.

In the route evaluation device according to the aspect of the invention, the classification unit may classify the interference forms on the basis of the behaviors of the host-vehicle and another mobile object until interference occurs. With this configuration, the classification unit can classify the interference forms taking into consideration whether the host-vehicle interferes with the route of another mobile object or another mobile object interferes with the route of the host-vehicle.

In the route evaluation device according to the aspect of the invention, the classification unit may classify the interference forms into at least an interference form in which the host-vehicle interferes with the route of another mobile object and an interference form in which another mobile object interferes with the route of the host-vehicle, and the route evaluation unit may highly evaluate the state, in which the host-vehicle interferes with the route of another mobile object, as a route to be avoided compared to the form in which another mobile object interferes with the route of the host-vehicle. With this configuration, interference occurring when the host-vehicle should avoid another mobile object can be avoided. As a result, it becomes possible to travel along a route in consideration of an operation of the driver of another vehicle, and a safer traffic environment can be realized.

Another aspect of the invention provides a route evaluation device. The route evaluation device includes a route candidate generation unit that generates route candidates of a host-vehicle, a route prediction unit that predicts routes of another mobile object, an objectivization unit that expresses interference forms of the route candidates of the host-vehicle and the predicted routes of another mobile object by objective numerical values, and a route evaluation unit that evaluates the route candidates of the host-vehicle on the basis of the numerical values expressed by the objectivization unit.

The term "route" used herein also refers to a concept including temporal elements, such as time and speed, and is different from the term "path" which does not include the concept of such temporal elements. In addition, similarly to the term "interference" described above, the term "interference" used herein refers to the host-vehicle and another vehicle crossing each other planarly in consideration of the vehicle width and the vehicle length. The objective numerical value of the interference state is calculated on the basis of the state of the host-vehicle or another vehicle (for example, position, speed, and direction).

With the route evaluation device according to another aspect of the invention, the interference state is numericalized in accordance with the prescribed rule of objective numericalization. Therefore, the interference form in which the host-vehicle interferes with the route of another mobile object can be numericalized, and the relevant route candidate can be highly evaluated as a route candidate to be avoided. As a result, it becomes possible to travel along a route in consideration of an operation of the driver of another vehicle, and a safer traffic environment can be realized.

In the route evaluation device according to another aspect of the invention, the objectivization unit may express the interference forms by objective numerical values on the basis of the behaviors of the host-vehicle and another mobile object until interference occurs. Therefore, the classification unit can numericalize the interference forms taking into consideration whether the host-vehicle interferes with the route of another mobile object or another mobile object interferes with the route of the host-vehicle.

In the route evaluation device according to another aspect of the invention, the objectivization unit may calculate an interference ratio representing a probability that the host-vehicle interferes with the route of the mobile object, and the higher the interference ratio, the more highly the route evaluation unit may evaluate the relevant route as a route to be avoided. Therefore, interference occurring when the host-vehicle should avoid another vehicle can be avoided. As a result, it becomes possible to travel along a route in consideration of an operation of the driver of another vehicle, and a safer traffic environment can be realized.

According to the aspects of the invention, it becomes possible to travel along a route in consideration of an operation of the driver of another vehicle, and a safer traffic environment can be realized.

BRIEF DESCRIPTION OF DRAWINGS

FIG. 14 is a diagram illustrating the criterion for classification of an interference state by the classification section of FIGS. 1 and 8.

DESCRIPTION OF EMBODIMENTS

Figure 1:
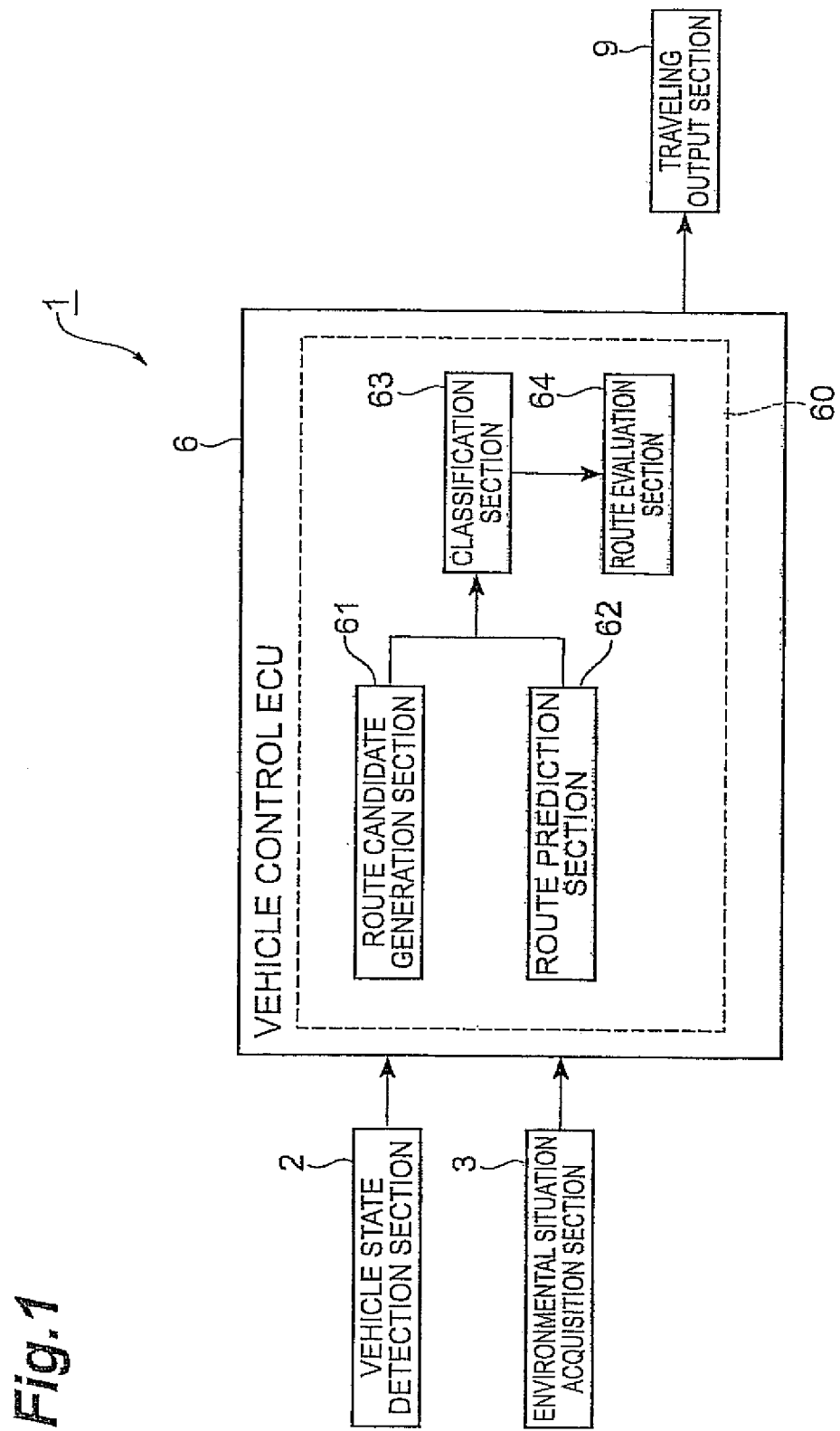
FIG. 1 is a block diagram showing the functional configuration of a traveling assist device including a route evaluation device according to an embodiment of the invention.

Hereinafter, a traveling assist device 1 including a route evaluation device 60 according to a first embodiment of the invention will be described with reference to FIGS. 1 to 7. In the description of the drawings, the same parts are represented by the same reference numerals, and overlapping description thereof will be omitted. FIG. 1 is a block diagram showing the functional configuration of the traveling assist device 1 including the route evaluation device 60 according to this embodiment.

The traveling assist device 1 includes a vehicle state detection section 2, an environmental situation acquisition section 3, a vehicle control ECU (Electronic Control Unit) 6, and a traveling output section 9.

The vehicle state detection section 2 functions as vehicle state detection means for detecting position information and vehicle speed information of a vehicle, and uses, for example, a GPS (Global Positioning System), a wheel speed sensor, and the like. The GPS acquires position information of a vehicle. The wheel speed sensor is, for example, attached to each wheel of the vehicle, and acquires the wheel speed of the vehicle. The vehicle state detection section 2 is connected to the vehicle control ECU 6 and outputs acquired vehicle state information, such as position information and wheel speed information, to the vehicle control ECU 6.

The environmental situation acquisition section 3 functions as environmental situation acquisition means for acquiring environmental situation information regarding the vicinity of a host-vehicle 81, and uses, for example, a vehicle-to-vehicle communication device, a road-to-vehicle communication device, a radar sensor using millimeter waves or laser, and the like. Position information and vehicle speed information of another vehicle (another mobile object) 82 can be acquired by using a vehicle-to-vehicle communication device and a road-to-vehicle communication device. Position information and relative speed information of another vehicle 82 and an obstacle on a road can be acquired by using a millimeter-wave radar sensor or the like. The environmental situation acquisition section 3 is connected to the vehicle control ECU 6 and outputs acquired environmental situation information regarding the vicinity of the host-vehicle 81 to the vehicle control ECU 6.

The vehicle control ECU 6 performs overall control of the traveling assist device 1 and primarily includes, for example, a computer including a central processing unit CPU, a ROM, and a RAM, which are not shown. The vehicle control ECU 6 is connected to the vehicle state detection section 2, the environmental situation acquisition section 3, and the traveling output section 9. The vehicle control ECU 6 receives various kinds of information from the vehicle state detection section 2 and the environmental situation acquisition section 3, and outputs various kinds of information to the traveling output section 9. The vehicle control ECU 6 has a route evaluation device 60 including a route candidate generation section (route candidate generation unit) 61, a route prediction section (route prediction unit) 62, a classification section (classification unit) 63, and a route evaluation section (route evaluation unit) 64.

Figure 2:
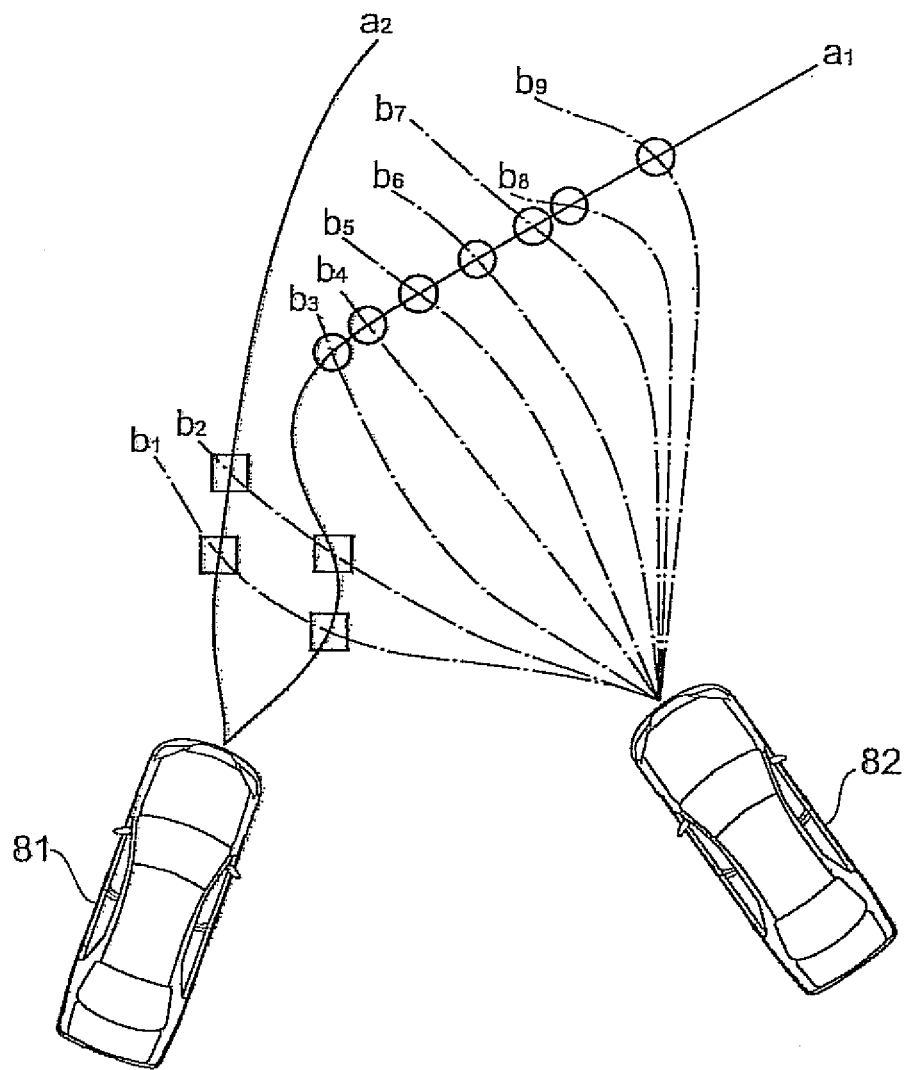
FIG. 2 is a diagram showing a route that is generated by a route candidate generation section and a route prediction section of FIG. 1.

As shown in FIG. 2, the route candidate generation section 61 generates route candidates $a_1$, $a_2$ of the host-vehicle 81. The route candidate generation section 61 predicts the state of future position, speed, direction, and the like of the host-vehicle 81 from information regarding the position, speed, direction, and the like of the host-vehicle 81 input from the vehicle state detection section 2. The route candidate generation section 61 generates information regarding the predicted future state of the host-vehicle 81 as the route candidates $a_1$ and $a_2$, and outputs the generated route candidates $a_1$ and $a_2$ to the classification section 63.

As shown in FIG. 2, the route prediction section 62 predicts routes $b_1$, $b_2$, . . . , and $b_n$ of another mobile object, such as another vehicle 82, on the basis of the traveling environment. The route prediction section 62 predicts the state of future position, speed, direction, and the like of another mobile object from information regarding the position, speed, direction, and the like of another mobile object input from the environmental situation acquisition section 3. The route prediction section 62 predicts information regarding the predicted future state of another mobile object as the routes $b_1$, $b_2$, . . . , and $b_n$, and outputs the predicted routes $b_1$, $b_2$, . . . , and $b_n$ to the classification section 63. In general, the routes $b_1$, $b_2$, . . . , and $b_n$ of another vehicle 82 are predicted exhaustively as compared with the route candidates of the host-vehicle 81.

The classification section 63 classifies the interference states of the route candidates $a_1$ and $a_2$ of the host-vehicle 81 generated by the route candidate generation section 61 and the predicted routes $b_1$, $b_2$, . . . , and $b_n$ of another mobile object predicted by the route prediction section 62 into a plurality of interference forms. Specifically, the classification section 63 classifies the interference forms into an interference form in which the host-vehicle 81 interferes with the route of another vehicle 82 and an interference form in which another vehicle 82 interferes with the route of the host-vehicle 81. In this case, the interference form in which the host-vehicle 81 interferes with the route of another vehicle 82 means an interference form occurring when the host-vehicle 81 should avoid another vehicle 82.

The route evaluation section 64 evaluates the route candidates $a_1$ and $a_2$ of the host-vehicle 81 on the basis of the interference forms classified by the classification section 63. Specifically, the route evaluation section 64 highly evaluates a route candidate classified by the classification section 63 as an interference form, in which the host-vehicle 81 interferes with the route of another vehicle 82, as a route that the host-vehicle 81 should avoid. For example, as shown in FIG. 2, with regard to the intersections between route candidates $a_1$ and $a_2$ of the host-vehicle and the predicted routes $b_1$, $b_2$, . . . , and $b_9$ of another vehicle, the route evaluation section 64 determines whether the host-vehicle 81 interferes with the route of another vehicle 82 or another vehicle 82 interferes with the route of the host-vehicle 81. Next, with regard to the route candidates $a_1$ and $a_2$ generated by the route candidate generation section 61, when the interference states at the respective intersections have any intersection at which the host-vehicle 81 interferes with the route of the another vehicle 82, the route evaluation section 64 highly evaluates the relevant route candidate as a route that the host-vehicle 81 should avoid. In FIG. 2, O represents an intersection at which the host-vehicle 81 interferes with the route of another vehicle 82, and □ represents an intersection at which another vehicle 82 interferes with the route of the host-vehicle 81.

The route candidate generation section 61, the route prediction section 62, the classification section 63, and the route evaluation section 64 primarily constituting the route evaluation device 60 may be configured by loading a program on the computer or may be configured by separate hardware.

As shown in FIG. 1, the traveling output section 9 is connected to the vehicle control ECU 6. The traveling output section 9 receives a control signal of the vehicle control ECU 6 and carries out driving of the host-vehicle 81, for example, traveling drive, a braking operation, and a steering operation. For the traveling output section 9, for example, a traveling drive ECU that controls an actuator for adjusting the opening degree of a throttle valve of an engine, a braking ECU that controls a brake actuator for adjusting hydraulic brake pressure, a steering ECU that controls a steering actuator for providing steering torque, and the like are used. The traveling output section 9 carries out driving of the host-vehicle 81, for example, traveling drive, a braking operation, and a steering operation, in accordance with a route which is highly evaluated as a route, along which the host-vehicle 81 may travel, by the route evaluation section 64.

Figure 3:
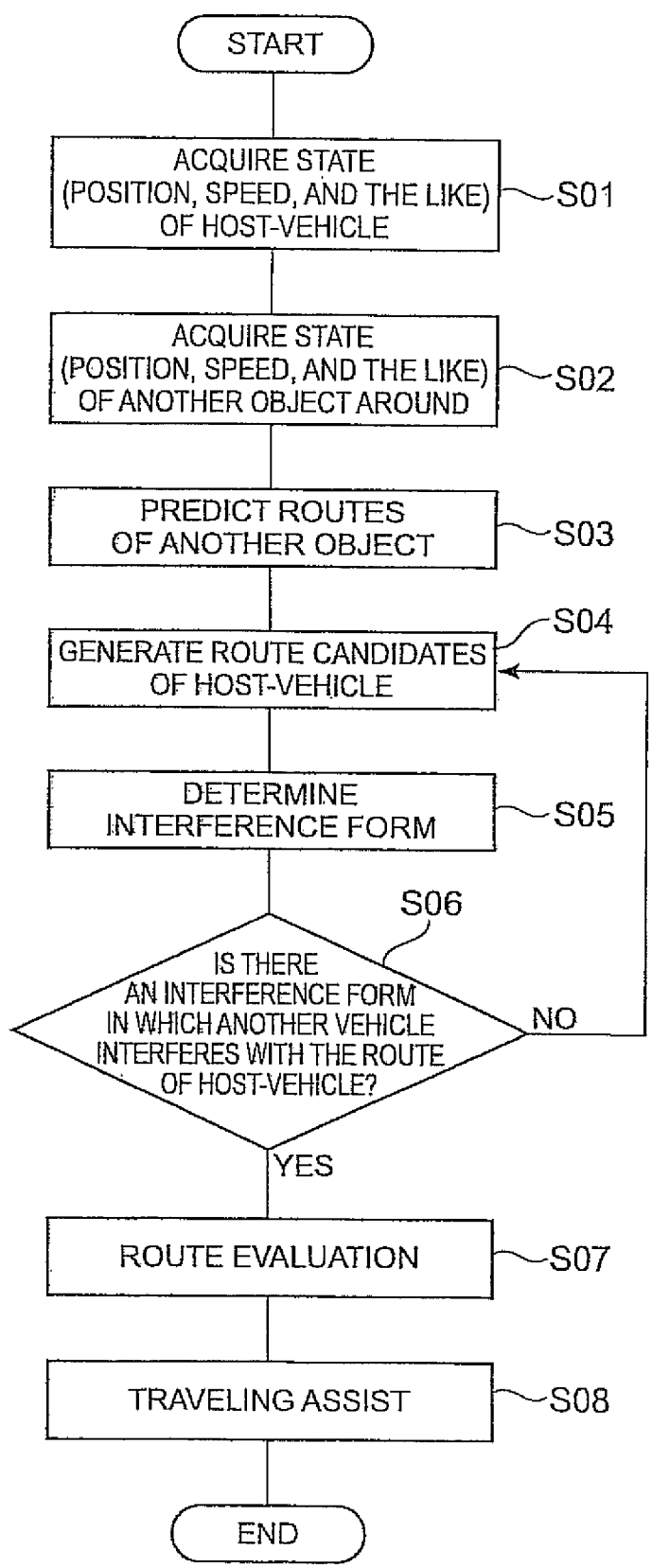
FIG. 3 is a flowchart showing an operation in the traveling assist device of FIG. 1.

Next, the operation of the route evaluation device 60 will be described with reference to FIG. 3. FIG. 3 is a flowchart showing a flow of characteristic processing which is executed by the route evaluation device 60.

First, the vehicle state detection section 2 acquires the state (position, speed, and the like) of the host-vehicle 81 (S01). Then, the vehicle state detection section 2 outputs the acquired information to the vehicle control ECU 6.

Next, the environmental situation acquisition section 3 acquires the position and state of another object in the vicinity of the host-vehicle 81 (S02), and outputs the acquired information to the vehicle control ECU 6. Hereinafter, it is assumed that the position of another object is the value regarding the center of another object, and the state of another object is specified by the position, speed, and the like.

Figure 4:
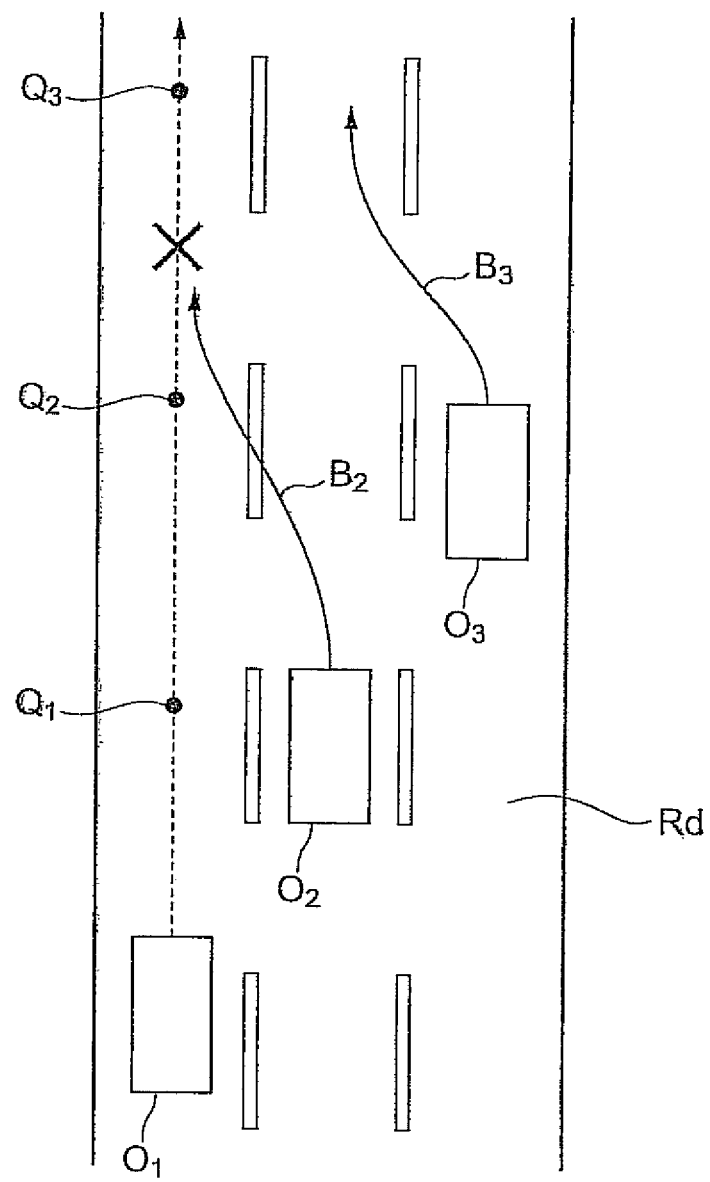
FIG. 4 is a diagram schematically showing a problem in a route prediction arithmetic operation of the related art.

From a technical viewpoint, when an arithmetic operation is carried out to generate a trace in a subsequent step, it is important that a prediction arithmetic operation is terminated in a predetermined period, regardless of whether or not the host-vehicle 81 reaches a prescribed location (destination or an intermediate location similar to the destination). In general, there is no location on a road where safety is ensured in advance. For example, as shown in FIG. 4, when it is predicted that a host-vehicle $O_1$ which is traveling on a three-lane road $R_d$ sequentially reaches locations $Q_1$, $Q_2$, and $Q_3$ set in advance, taking into consideration a case where the host-vehicle $O_1$ substantially travels in a straight line along the same lane toward the set locations, if another vehicle $O_3$ takes a route $B_3$, another vehicle $O_2$ may take a route $B_2$ to avoid risk and may enter a lane on which the host-vehicle $O_1$ is traveling. Thus, in the case of the route prediction arithmetic operation of the related art, it is not guaranteed in advance that the host-vehicle $O_1$ is traveling safely toward the locations set in advance.

Figure 5:
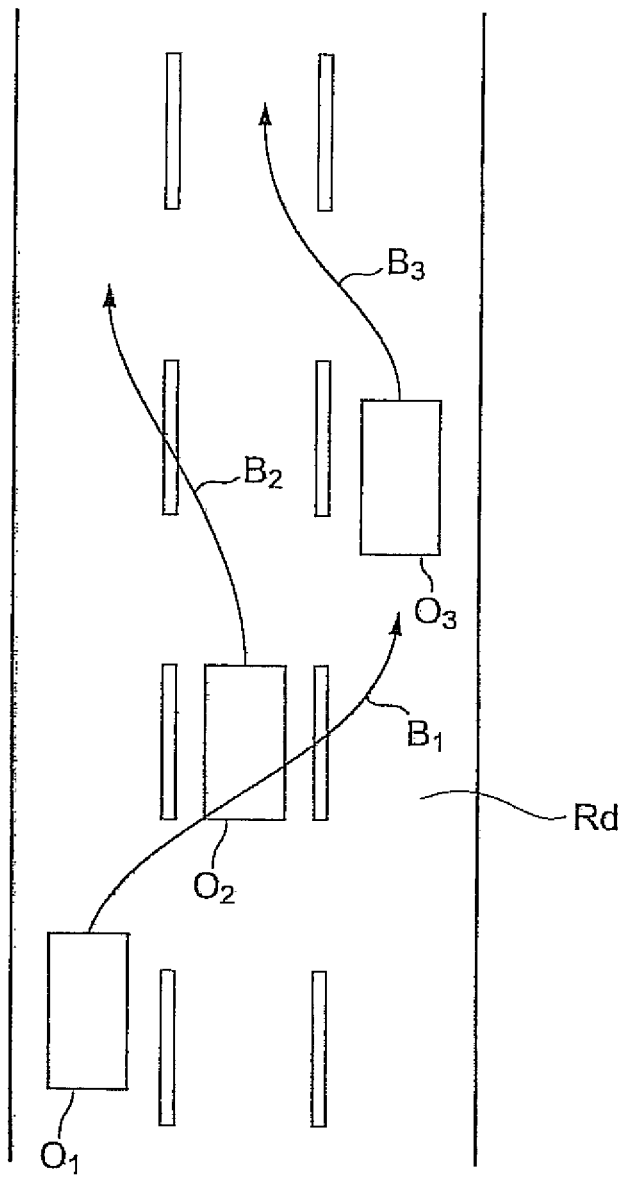
FIG. 5 is a diagram schematically showing advantages of a route prediction arithmetic operation in an interference evaluation method of the traveling assist device of FIG. 1.

In this embodiment, since an optimum route is determined every time, instead of determining a location, such as a destination, to be reached by the host-vehicle $O_1$ in advance, for example, a route $B_1$ shown in FIG. 5 can be selected as the route of host-vehicle $O_1$ under the same situation as in FIG. 4, and risk can be accurately avoided at the time of traveling of the host-vehicle $O_1$, thereby ensuring safety.

Returning to FIG. 3, the route prediction section 62 predicts the future position and state of another object from information regarding the position and state of another object acquired by the environmental situation acquisition section 3, and predicts the routes $b_1, b_2, \ldots,$ and $b_9$ of another object shown in FIG. 2 (S03). In the following description, description will be provided for a case where another object is another vehicle 82, but another object may be a person, an obstacle, or the like other than a vehicle.

Next, the route candidate generation section 61 predicts the future position and state of the host-vehicle 81 from information regarding the state of an object in the vicinity of the host-vehicle 81 acquired by the vehicle state detection section 2, and generates the route candidates $a_1$ and $a_2$ shown in FIG. 2 (S04). Specifically, the route candidate generation section 61 generates a temporal-spatial route constituted by time and space for each object. In generating the route, it is assumed that the total number of objects (including the host-vehicle 81) acquired by the environmental situation acquisition section 3 is K, and an arithmetic operation is carried out $N_k$ times to generate a route for one object $O_k$ (where $1 \leq k \leq K$, is a natural number) (in this way, k and $N_k$ are all natural numbers). It is also assumed that the time (trace generation time) for generating a route is T (>0). The route may be calculated by a known method, for example, a method described in Japanese Unexamined Patent Application Publication No. 2007-230454.

Next, the classification section 63 determines the interference states of the route candidates $a_1$ and $a_2$ of the host-vehicle 81 generated by the route candidate generation section 61 and the predicted routes $b_1, b_2, \ldots,$ and $b_9$ of another mobile object predicted by the route prediction section 62 (S05). Specifically, as shown in FIG. 2, with regard to the intersections between the route candidates $a_1$ and $a_2$ of the host-vehicle 81 and the predicted routes $b_1, b_2, \ldots,$ and $b_9$ of the another vehicle 82, it is determined whether the host-vehicle 81 interferes with the route of another vehicle 82 or another vehicle 82 interferes with the route of the host-vehicle 81. When the classification section 63 classifies the interference states, any classification method in consideration of another vehicle may be used. For example, classification based on the mechanical conditions of smoothness (curvature, acceleration/deceleration, and the like) of a route immediately before interference, classification based on the social norms, such as the observance level of the traffic rules or manners, the fault proportion of automobile insurance, and the judicial precedents, classification (paying closer attention to a bicycle and a small vehicle) in consideration of vehicle performance, and the like may be used.

Next, the classification section 63 classifies the route candidates by interference forms on the basis of the interference states determined in S05 (S06). Here, the route candidates are classified into "an interference form in which the host-vehicle 81 interferes with the route of another vehicle" and "an interference form in which another vehicle 82 interferes with the route of the host-vehicle". As shown in FIG. 2, when one of the route candidates $a_1$ and $a_2$ has any intersection (indicated by O in FIG. 2) where the host-vehicle 81 interferes with another vehicle, the classification section 63 classifies the relevant route candidate as "the interference form in which the host-vehicle 81 interferes with the route of another vehicle". Referring to FIG. 2, the route candidate $a_1$ has an intersection (indicated by O in FIG. 2) where the host-vehicle 81 interferes with the route of another vehicle, such that the route candidate $a_1$ is classified into "the interference form in which the host-vehicle 81 interferes with the route of another vehicle". Meanwhile, the route candidate $a_2$ has only an intersection (indicated by □ in FIG. 2) where another vehicle 82 interferes with the route of the host-vehicle but has no intersection (indicated by O in FIG. 2) where the host-vehicle 81 interferes with the route of another vehicle, such that the route candidate $a_2$ is classified into "the interference form in which another vehicle 82 interferes with the route of the host-vehicle". In this case, no route candidate has "the interference form in which another vehicle 82 interferes with the route of the host-vehicle" (S06: NO), the process returns to Step S04, and route candidates are generated again (S04).

Next, in Step S06, when the route candidates $a_1$ or $a_2$ have "the interference form in which another vehicle 82 interferes with the route of host-vehicle" (S06: YES), the route evaluation section 64 highly evaluates the relevant route candidate as a route that the host-vehicle 81 should travel (S07). Then, the traveling output section 9 carries out driving of the host-vehicle 81, for example, traveling drive, a braking operation, and a steering operation, in accordance with a route which is highly evaluated as a route, along which the host-vehicle 81 may travel, by the route evaluation section 64 (S08).

As described above, according to the traveling assist device 1 of this embodiment, the classification section 63 classifies the interference forms on the basis of a plurality of interference forms stored in advance, and the route evaluation section 64 evaluates the route candidates on the basis of the classification result. Therefore, an interference form in which the host-vehicle 81 interferes with the route of another vehicle 82 can be classified as one interference form, and the relevant route candidate can be highly evaluated as a route candidate to be avoided. As a result, it becomes possible to travel along a route in consideration of an operation of the driver of another vehicle 82, and a safer traffic environment can be realized.

Figure 6:
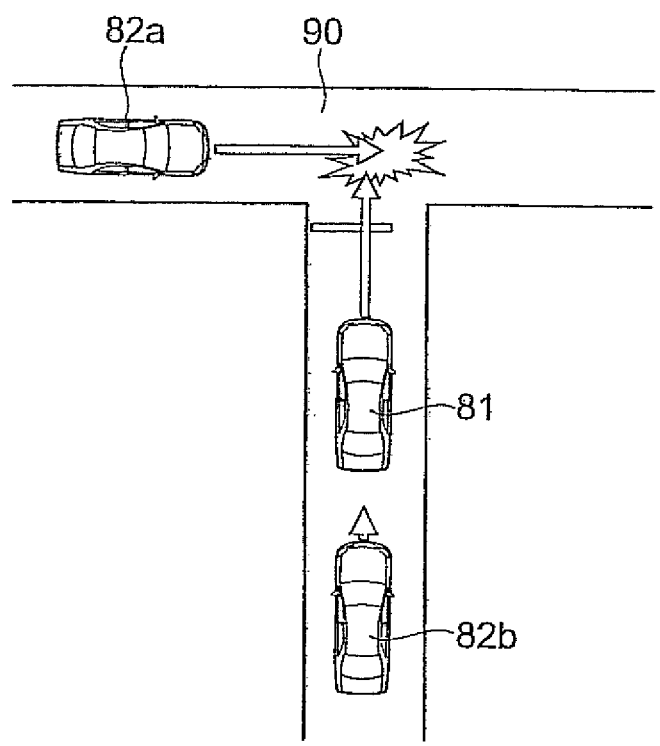
FIG. 6 is a diagram illustrating traveling control of a host-vehicle according to a traveling assist device of the related art.
Figure 7:
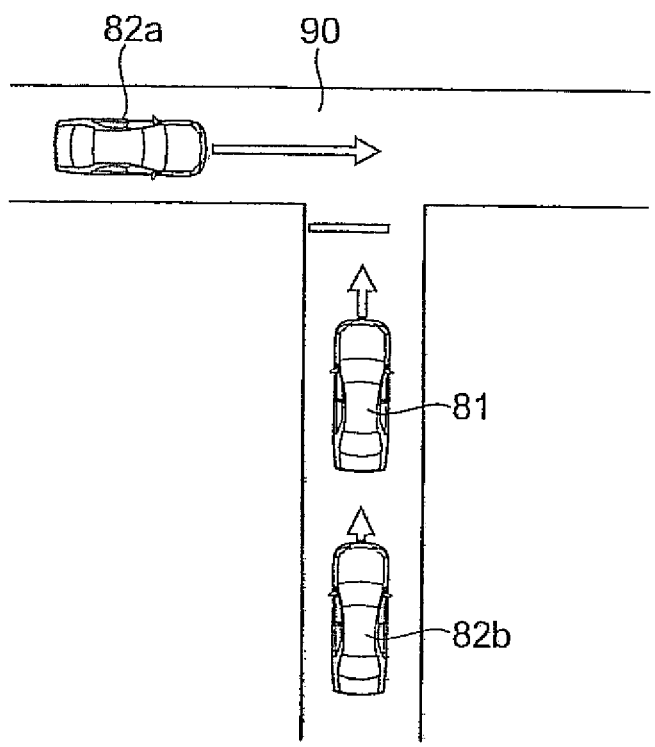
FIG. 7 is a diagram illustrating traveling control of a host-vehicle according to the traveling assist device of FIG. 1.

With regard to traveling control when a vehicle enters a main road 90 continuously with another vehicle 82a at a T-junction, the effects of the traveling assist device 1 of this embodiment will be described with reference to FIGS. 6 and 7.

According to the traveling assist device of the related art, traveling control of the host-vehicle 81 is carried out in accordance with a route which is determined to be low risk, regardless of the interference forms of the route candidates of the host-vehicle and the predicted routes of another vehicle. For this reason, when the degree of risk is low, for example, as shown in FIG. 6, even when a route along which the host-vehicle 81 enters the main road 90 interferes with the route of another vehicle 82a, traveling control is carried out to allow the host-vehicle 81 to enter the main road 90. In this case, the movement of the host-vehicle 81 causes interference with the route of another vehicle 82a, that is, interference occurring when the host-vehicle 81 should avoid another vehicle 82*a*. For this reason, the driver of another vehicle 82*a* may be forced to take a sudden avoidance operation or braking operation.

Meanwhile, according to the traveling assist device 1 of this embodiment, with regard to a plurality of route candidates, even when it is determined that the route along which the vehicle enters the main road 90 is lowest risk, if the classification section 63 classifies the relevant route into "interference form in which the host-vehicle 81 interferes with the route of another vehicle", the route evaluation section 64 highly evaluates the relevant route as a route that the host-vehicle 81 should avoid. Then, the route evaluation section 64 highly evaluates a route, which is classified as "the interference form in which another vehicle 82*b* interferes with the route of the host-vehicle" by the classification section 63, that is, as shown in FIG. 7, a route along which the vehicle does not enter the main road 90 as a route that the host-vehicle 81 should travel. Therefore, interference occurring when the host-vehicle 81 should avoid another vehicle 82*a* can be avoided. As a result, it becomes possible to travel along a route in consideration of an operation of the driver of another vehicle 82*a*, and a safer traffic environment can be realized. Meanwhile, another vehicle 82*b* encounters interference occurring when another vehicle 82*b* should avoid the host-vehicle 81, such that another vehicle 82*b* can avoid interference in cooperation with the host-vehicle 81.

Although the embodiment of the invention has been described, the invention is not limited to the above-described embodiment, and various modifications or changes may be made without departing from the scope of the invention.

Figure 8:
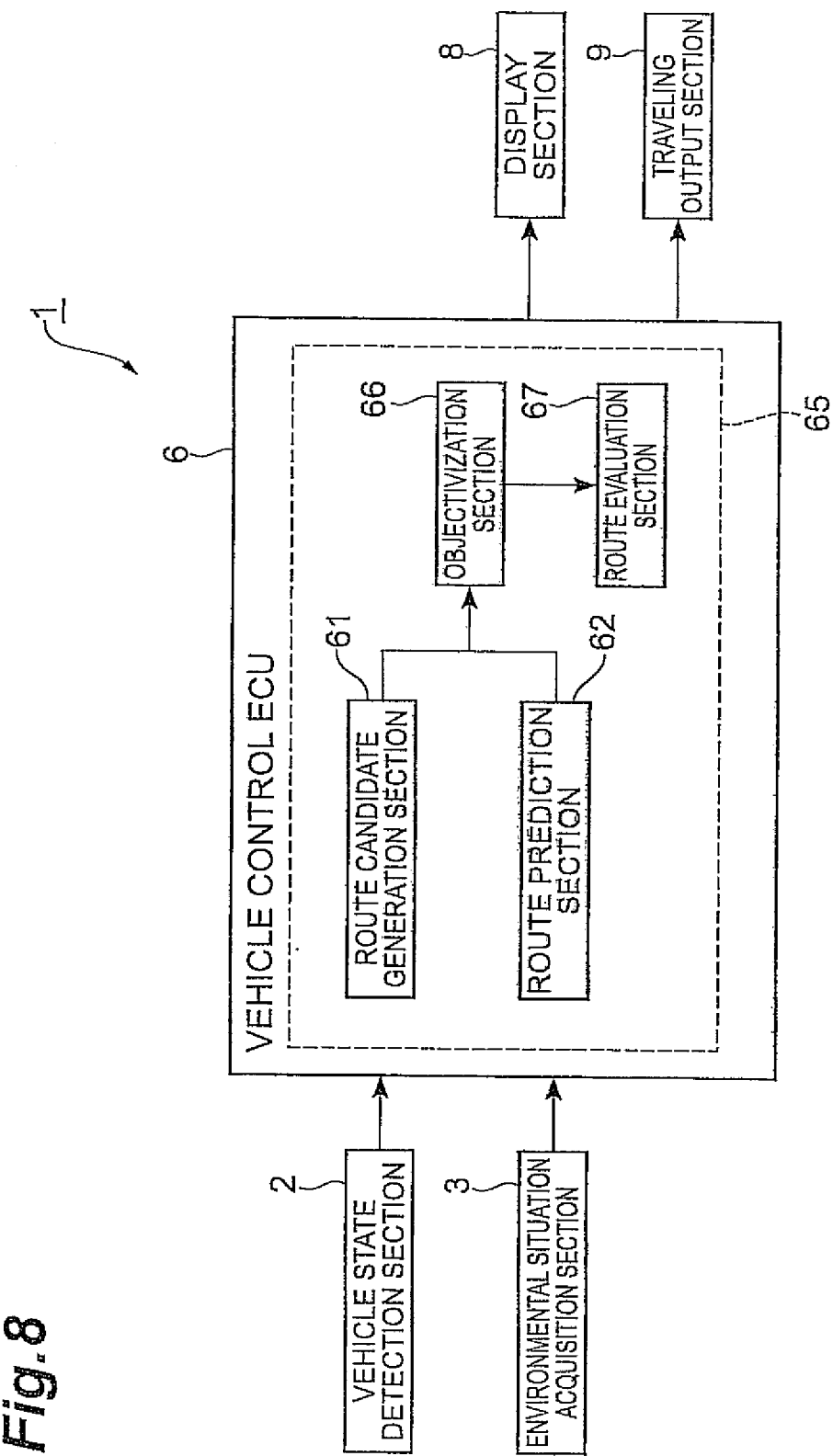
FIG. 8 is a block diagram showing the functional configuration of a traveling assist device including a route evaluation device according to another embodiment of the invention.

Although in the foregoing embodiment, as shown in FIG. 1, the example where the route evaluation device 60 includes the route candidate generation section 61, the route prediction section 62, the classification section 63, and the route evaluation section 64 has been described, the invention is not limited thereto. For example, as shown in FIG. 8, a route evaluation device 65 may include a route candidate generation section 61, a route prediction section 62, an objectivization section (objectivization unit) 66, and a route evaluation section (route evaluation unit) 67. The route candidate generation section 61 and the route prediction section 62 are the same as those in the route evaluation device 60 of the foregoing embodiment, and thus description thereof will not be repeated.

Figure 9:
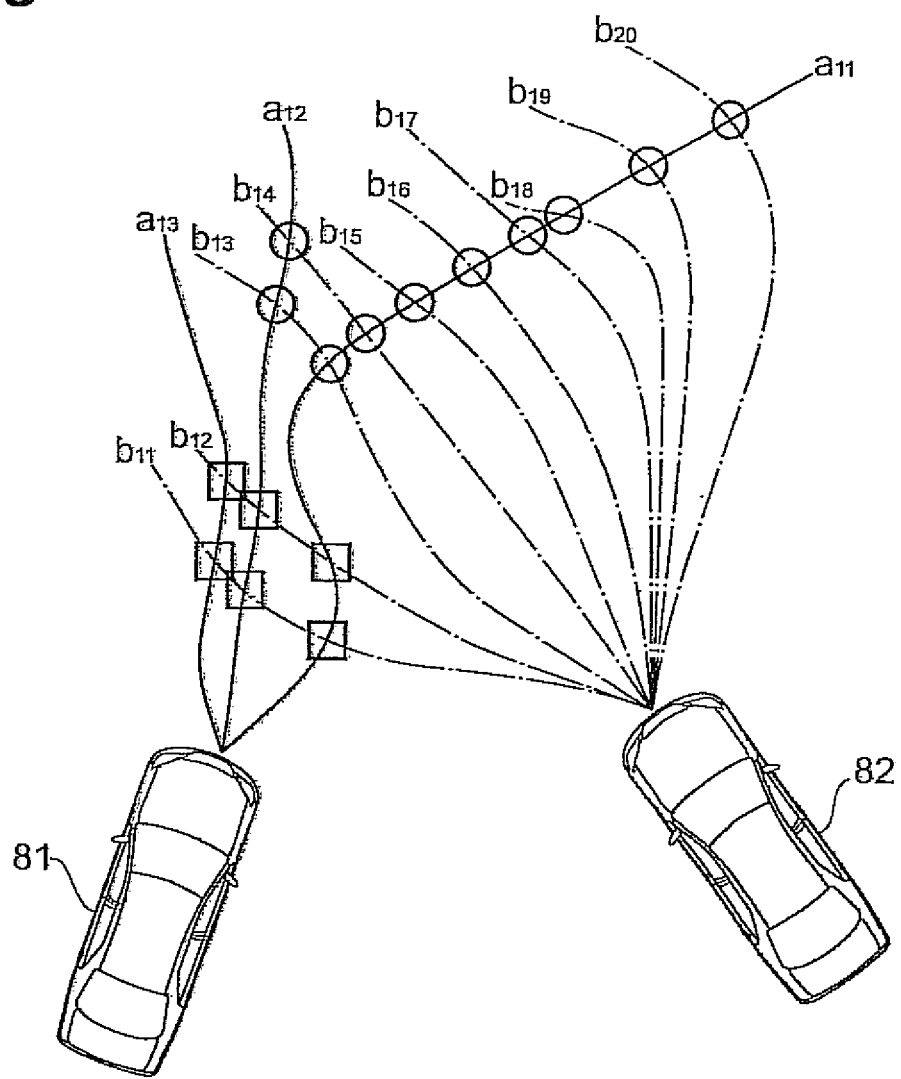
FIG. 9 is a diagram showing a route that is generated by a route candidate generation section and a route prediction section of FIG. 8.

As shown in FIG. 9, the objectivization section 66 expresses the interference states of route candidates $a_{11}$, $a_{12}$, and $a_{13}$ of the host-vehicle 81 generated by the route candidate generation section 61 and predicted routes $b_{11}$, $b_{12}$, ..., and $b_{20}$ of another vehicle 82 predicted by the route prediction section 62 by objective numerical values. Specifically, the objectivization section 66 calculates an another-vehicle interference ratio. The term "another-vehicle interference ratio" refers to the ratio of intersections (indicated by O in FIG. 9) where the host-vehicle 81 interferes with the route of another vehicle from among all the intersections of the route candidates $a_{11}$, $a_{12}$, and $a_{13}$ and the predicted routes $b_{11}$, $b_{12}$, ..., and $b_{20}$. Referring to FIG. 9, the route candidate $a_{11}$ has 10 intersections in total and has eight intersections (indicated by O in FIG. 9) where the host-vehicle 81 interferes with the route of another vehicle, such that the another-vehicle interference ratio becomes 80%. Similarly, the another-vehicle interference ratio of the route candidate $a_{12}$ becomes 50%, and the another-vehicle interference ratio of the route candidate $a_{13}$ becomes 0%.

The route evaluation section 67 evaluates the route of the host-vehicle 81 on the basis of the numerical values expressed by the objectivization section 66. Specifically, the route evaluation section 64 highly evaluates a route candidate having a low another-vehicle interference ratio expressed by the objectivization section 66 as a route that the host-vehicle 81 should avoid. For example, the route evaluation section 67 highly evaluates a route candidate having an another-vehicle interference ratio equal to or smaller than 20% as a route that the host-vehicle 81 should travel. The critical value of the another-vehicle interference ratio may be appropriately set.

According to the route evaluation device 65 of this embodiment, the interference forms are numericalized in accordance with the prescribed rule of objective numericalization. Therefore, an interference form in which the host-vehicle 81 interferes with the route of another vehicle can be specified, and the relevant route candidate can be highly evaluated as a route candidate to be avoided. As a result, traveling along a route in consideration of an operation of the driver of another vehicle 82, and a safer traffic environment can be realized.

As shown in FIG. 8, the traveling assist device 1 may further include a display section 8. The display section 8 is means for displaying the contents of the route candidates evaluated by the route evaluation section 67, and for example, displays the contents on a monitor or projects the contents onto a windscreen. Specifically, the display section 8 displays a route specified as "the interference form in which another vehicle interferes with the route of the host-vehicle" and a route specified as "the interference form in which the host-vehicle interferes with the route of another vehicle" based on the evaluation of the route candidates by the route evaluation section 67 with different colors. Therefore, it is possible to display for the driver a route that the host-vehicle should travel or a route that the host-vehicle should avoid.

The traveling assist device 1 may have the display section 8 but may not have the traveling output section 9. In this case, it is possible for the driver to recognize a route specified as "the interference form in which another vehicle interferes with the route of the host-vehicle". In this case, the driver can control the host-vehicle in accordance with a route displayed on the display section 8. As a result, it becomes possible to travel of the host-vehicle 81 along a route in consideration of an operation of the driver of another vehicle 82, and a safer traffic environment can be realized.

In the traveling assist device 1 of the foregoing embodiment, when the classification section 63 classifies the interference states, any classification method in consideration of another vehicle may be used, and for example, classification based on the mechanical conditions of smoothness (curvature, acceleration/deceleration, and the like) of a route immediately before interference, classification based on the social nouns, such as the observance level of the traffic rules or manners, the fault proportion of automobile insurance, and the judicial precedents, classification (paying closer attention to a bicycle and a small vehicle) in consideration of vehicle performance, and the like may be used. Hereinafter, the method of classifying the interference states by the classification section 63 will be described in detail.

Figure 10:
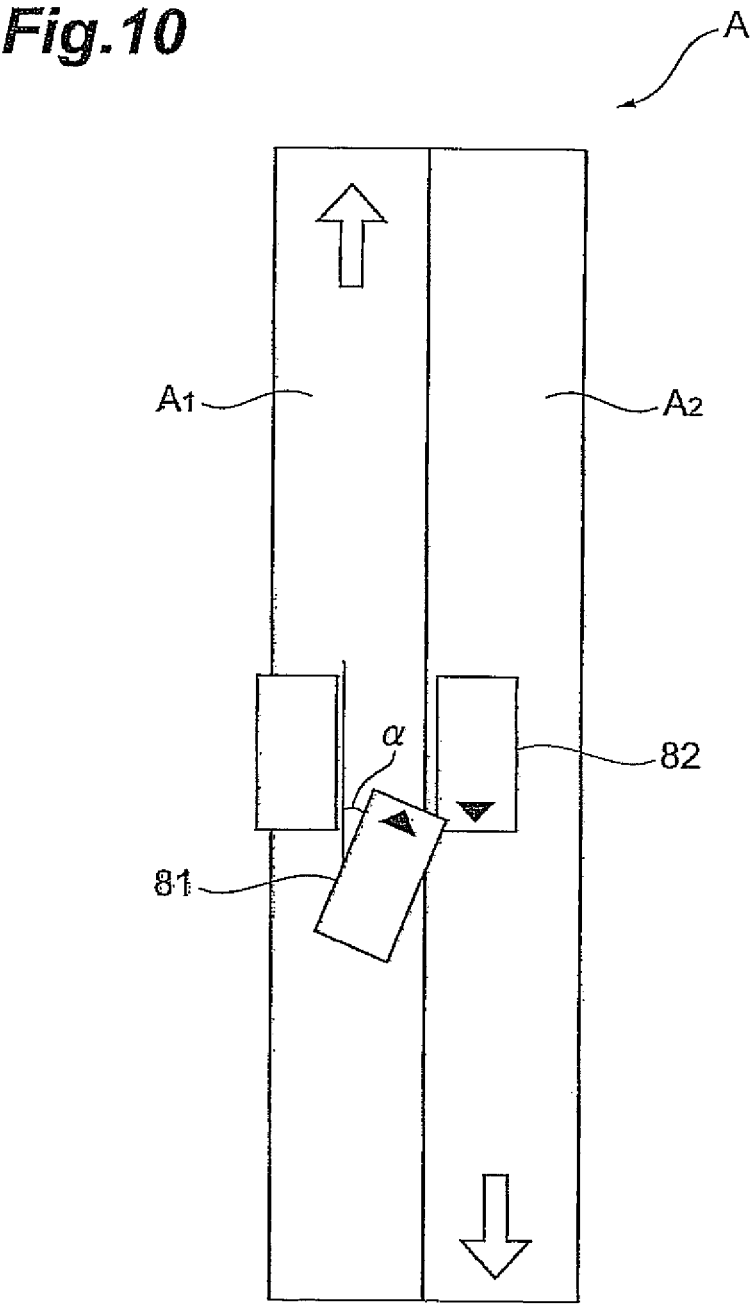
FIG. 10 is a diagram illustrating the criterion for classification of an interference state by a classification section of FIGS. 1 and 8.

For example, as shown in FIG. 10, it may be determined whether the host-vehicle 81 is likely to interfere with the route of another vehicle 82 or not on the basis of an angle α between the direction of the host-vehicle 81 and the traveling direction of a region A1 where the host-vehicle 81 is located. For example, when the angle α between the direction of the host-vehicle 81 and the traveling direction of the region A1 where the host-vehicle 81 is present is equal to or greater than a predetermined angle (for example, 45°), it may be determined that the host-vehicle 81 interferes with the route of another vehicle 82.

Figure 11:
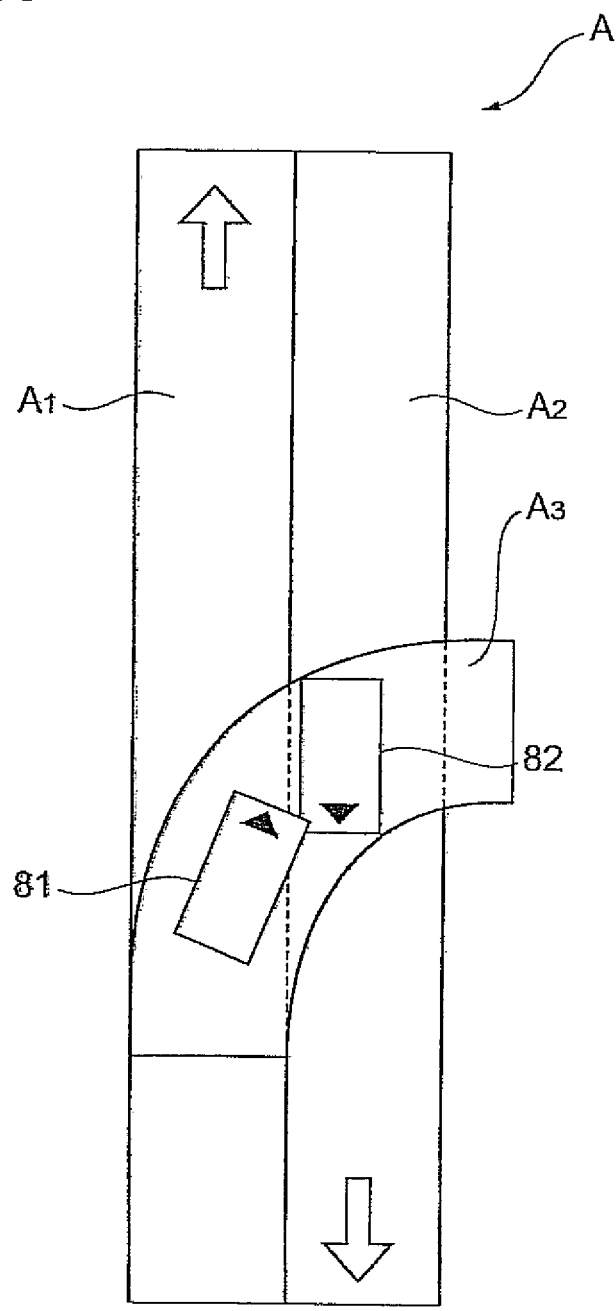
FIG. 11 is a diagram illustrating the criterion for classification of an interference state by the classification section of FIGS. 1 and 8.
Figure 12:
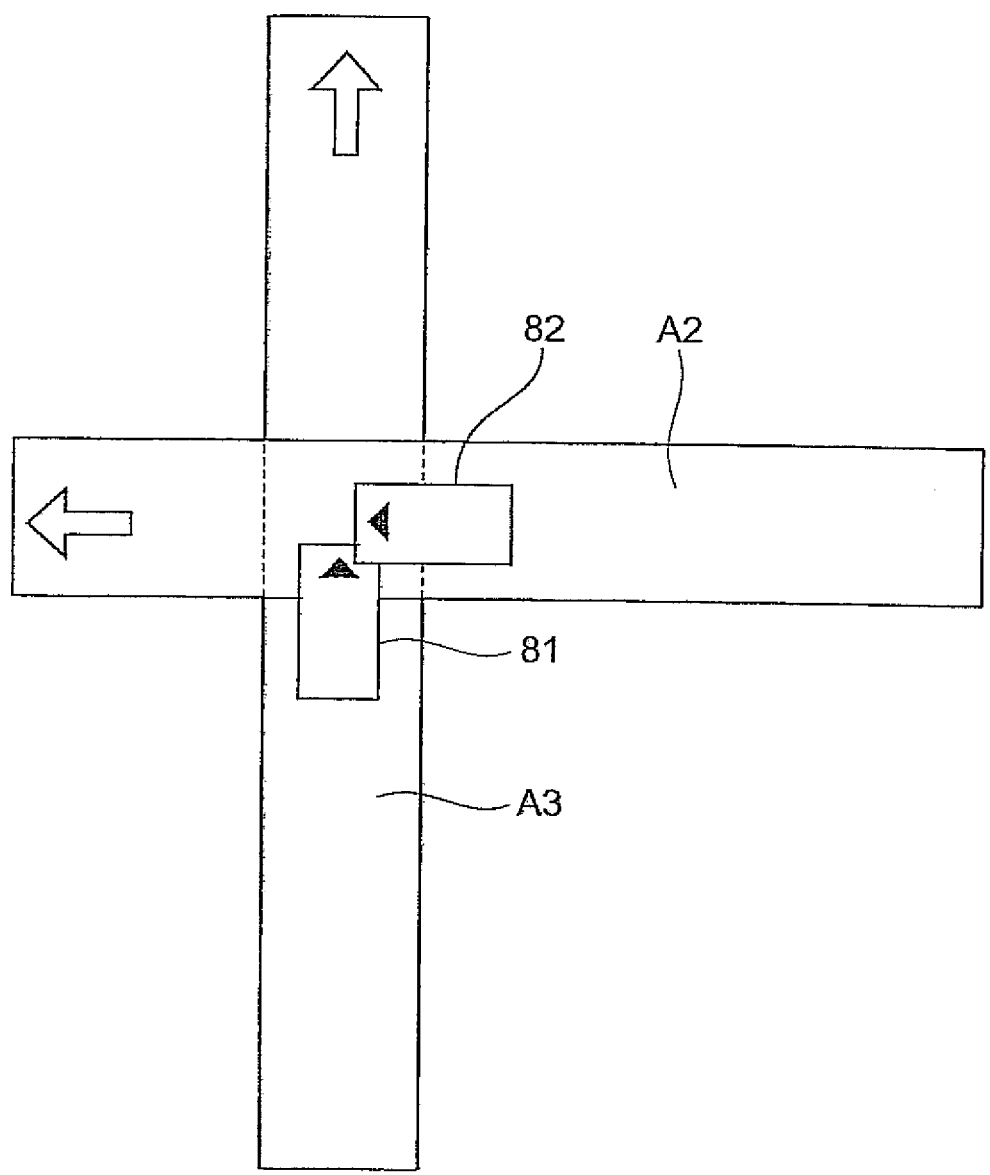
FIG. 12 is a diagram illustrating the criterion for classification of an interference state by the classification section of FIGS. 1 and 8.

For example, as shown in FIG. 11, it may be determined whether the host-vehicle 81 is likely to interfere with the route of another vehicle 82 or not on the basis of the priorities of a region A3 where the host-vehicle 81 is located and a region A2 where another vehicle 82 is located. For example, when the region A3 where the host-vehicle 81 is located has a priority lower than the region A2 where another vehicle 82 is located, it may be determined that the host-vehicle 81 interferes with the route of another vehicle 82. In comparison of the priorities of the region A3 where the host-vehicle 81 is located and the region A2 where another vehicle 82 is located, at an intersection shown in FIG. 12, it may be determined that the host-vehicle 81 is likely to interfere with the route of another vehicle 82. The priority based on signal information as well as the priority based on the region where the host-vehicle 81 is located may be used. For example, a vehicle which runs into a green light has high priority, and a vehicle which runs into a red light has low priority.

Figure 13:
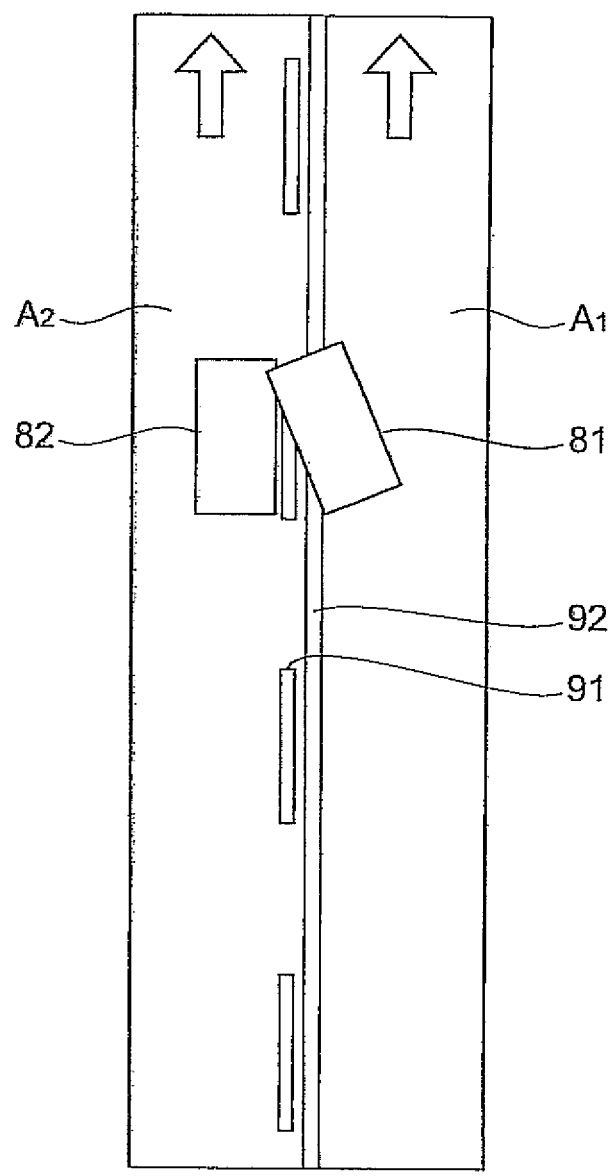
FIG. 13 is a diagram illustrating the criterion for classification of an interference state by the classification section of FIGS. 1 and 8.

For example, as shown in FIG. 13, it may be determined whether the host-vehicle 81 is likely to interfere with the route of another vehicle 82 or not on the basis of road markings 91 and 92. When the road marking 91 is a white line and the road marking 92 is a yellow line, if the host-vehicle 81 which is traveling in a region A1 changes lane to a region A2, the host-vehicle 81 is violating the traffic rules. With regard to traveling which violates the traffic rules, it may be determined that the host-vehicle 81 interferes with the route of another vehicle 82. For the determination regarding violation of the traffic rules, road signs as well as road markings may be used.

Figure 15:
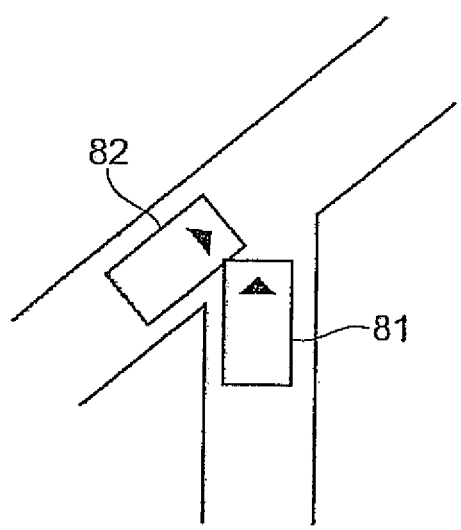
FIG. 15 is a diagram illustrating the criterion for classification of an interference state by the classification section of FIGS. 1 and 8, together with FIG. 14.

For example, as shown in FIG. 14, it may be determined whether the host-vehicle 81 is likely to interfere with the route of another vehicle 82 or not by using the parts where the host-vehicle 81 and another vehicle 82 interfere with each other. In FIG. 14, "A" indicates that the host-vehicle 81 interferes with the route of another vehicle 82, and "B" indicates that another vehicle 82 interferes with the route of the host-vehicle 81. For example, as shown in FIG. 15, when the front surface of the host-vehicle 81 in the traveling direction and the side surface of another vehicle 82 in the traveling direction interfere with each other, as shown in FIG. 14, it may be determined that the host-vehicle 81 interferes with the route of another vehicle 82.

INDUSTRIAL APPLICABILITY

According to the invention, it is possible to travel along a route in consideration of an operation of the driver of another vehicle, and can realize a safer traffic environment.

The invention claimed is:

1. A traveling assist device of a host vehicle, comprising;
a vehicle speed sensor that detects speed information of the host-vehicle;
a vehicle position sensor that detects position information of the host-vehicle; and
an electronic control unit that includes a central processing unit, wherein the electronic control unit is operatively connected to the vehicle speed sensor, the vehicle position sensor, and the host-vehicle, and wherein the electronic control unit is configured to:
acquire environmental situation information regarding a vicinity of the host-vehicle, wherein the environmental situation information includes a position and a state of a mobile object in the vicinity of the host-vehicle;
predict a future state of the host-vehicle based on one or more of the speed information, the position information of the host-vehicle, and the environmental situation information including the position and the state of the mobile object in the vicinity of the host-vehicle;
generate a plurality of route candidates of the host-vehicle;
predict a future state of the mobile object in the vicinity of the host-vehicle based on the environmental situation information;
generate a plurality of route candidates of the mobile object;
classify interference states of the route candidates of the host-vehicle and the route candidates of the mobile object into a plurality of interference forms stored in advance based on whether or not the host vehicle or the mobile object is violating traffic rules;
determine a route of the host-vehicle based on the classified interference states; and
control the traveling of the host-vehicle based on the determined route.

2. The traveling assist device of a host vehicle according to claim 1, further comprising:
a display device,
wherein the electronic control unit is configured to classify the interference states of the route candidates of the host-vehicle and the route candidates of the mobile object into a first interference form in which the host-vehicle interferes with the route of the mobile object and a second interference form in which the mobile object interferes with the route of the host-vehicle; and
wherein the display device is configured to display a first route classified as the first interference form and a second route classified as the second interference form with different colors.

3. The traveling assist device of a host vehicle according to claim 2,
wherein the electronic control unit is configured to classify the interference states of the route candidates of the host vehicle into the first interference form in a case that the host vehicle is violating the traffic rules, and classify the interference states of the route candidates of the mobile object into the second interference form in a case that the mobile object is violating the traffic rules.

4. The traveling assist device of a host vehicle according to claim 1,
wherein the electronic control unit is configured to determine whether or not the host vehicle is violating the traffic rules based on road markings in a vicinity of the mobile object.

5. The traveling assist device of a host vehicle according to claim 1,
wherein the electronic control unit is configured to determine whether or not the host vehicle is violating the traffic rules based on road signs.

* * * * *

UNITED STATES PATENT AND TRADEMARK OFFICE
CERTIFICATE OF CORRECTION

PATENT NO. : 10,239,523 B2
APPLICATION NO. : 15/644190
DATED : March 26, 2019
INVENTOR(S) : Katsuhiro Sakai et al.

It is certified that error appears in the above-identified patent and that said Letters Patent is hereby corrected as shown below:

In the Specification

In Column 10, Line 56, after "social", delete "nouns" and insert --norms--, therefor.

Signed and Sealed this
Seventh Day of May, 2019

Andrei Iancu
*Director of the United States Patent and Trademark Office*